United States Patent
Tambini et al.

(10) Patent No.: US 8,826,982 B2
(45) Date of Patent: Sep. 9, 2014

(54) METHOD AND SYSTEM FOR DETECTING THE GEOMETRY OF UNDERGROUND FRACTURES

(75) Inventors: Mauro Tambini, Milan (IT); Giuseppe Gammariello, Rome (IT)

(73) Assignee: ENI S.p.A., Roma (IT)

( * ) Notice: Subject to any disclaimer, the term of this patent is extended or adjusted under 35 U.S.C. 154(b) by 513 days.

(21) Appl. No.: 13/130,248

(22) PCT Filed: Nov. 19, 2009

(86) PCT No.: PCT/EP2009/008412
§ 371 (c)(1),
(2), (4) Date: Jul. 20, 2011

(87) PCT Pub. No.: WO2010/057677
PCT Pub. Date: May 27, 2010

(65) Prior Publication Data
US 2011/0277994 A1 Nov. 17, 2011

(30) Foreign Application Priority Data
Nov. 21, 2008 (IT) .............................. MI2008A2084

(51) Int. Cl.
*E21B 43/26* (2006.01)
*G01V 3/30* (2006.01)
*G01S 13/88* (2006.01)

(52) U.S. Cl.
CPC .. *G01V 3/30* (2013.01); *G01S 13/88* (2013.01)
USPC ........ 166/271; 166/250.01; 166/66; 342/333; 342/338

(58) Field of Classification Search
CPC ......... E21B 43/26; E21B 47/082; G01V 3/30; G01V 2210/6163; G01V 3/165; G01S 13/88; G01B 7/02
USPC .............................. 166/250.1, 66, 308.1, 271
See application file for complete search history.

(56) References Cited

U.S. PATENT DOCUMENTS

| 4,814,768 | A | 3/1989 | Chang | |
|---|---|---|---|---|
| 2003/0089494 | A1 | 5/2003 | Van Oers et al. | |
| 2005/0183858 | A1* | 8/2005 | Ayoub et al. | 166/250.1 |
| 2006/0102345 | A1* | 5/2006 | McCarthy et al. | 166/250.1 |
| 2007/0256830 | A1* | 11/2007 | Entov et al. | 166/250.1 |
| 2008/0062036 | A1 | 3/2008 | Funk et al. | |

FOREIGN PATENT DOCUMENTS

| EP | 1 901 094 | 3/2008 |
|---|---|---|
| WO | 02 04987 | 1/2002 |

OTHER PUBLICATIONS

International Search Report Issued Apr. 29, 2010 in PCT/EP09/008412 filed Nov. 19, 2009.

* cited by examiner

*Primary Examiner* — Yong-Suk (Philip) Ro
(74) *Attorney, Agent, or Firm* — Oblon, Spivak, McClelland, Maier & Neustadt, L.L.P.

(57) ABSTRACT

A method for detecting the geometry of underground fractures comprising:
introducing a filling material (14) into an underground fracture (11) to form a pack of filling material (14);
transmitting an electromagnetic field into the fracture (11);
detecting at least one reflected signal of the electromagnetic field transmitted; and
processing the at least one detected signal to reconstruct the geometric and dimensional characteristics of the pack of filling material (14);
wherein the electromagnetic field transmitted into the fracture (11) has a frequency comprised in the range of between 30 megahertz and 250 megahertz and in that said filling material is not added with any additives;
and a system for implementing the aforementioned method.

18 Claims, 4 Drawing Sheets

METHOD AND SYSTEM FOR DETECTING THE GEOMETRY OF UNDERGROUND FRACTURES

BACKGROUND OF THE INVENTION

1. Field of the invention

The present invention refers to a method and system for detecting the geometry and dimensions of underground fractures, in particular capable of determining the length and height of such fractures.

2. Description of the Background

In the field of the extraction of hydrocarbons, such as oil and/or natural gas, the production of a well can be improved by causing the hydraulic fracturing of the underground formation of hydrocarbons through the injection of a suitable pressurised liquid into the well itself. A filling material called proppant is then inserted into the produced fracture that prevents it from closing when the hydraulic pressure applied stops.

The volume filled with proppant constitutes the hydraulically conductive part of the induced fracture. Therefore, knowing, in real time or a posteriori, the geometry, in particular height and length, and relative other dimensions of such a volume or proppant pack is considered a key element in determining the quality of the treatment with the relative evaluations on the possible further actions to undertake and on the productivity of the well. Other fields of application in which methods for estimating or detecting the geometry of underground fractures are currently used are, for example diagnostics of other techniques for stimulating the production of hydrocarbons, like matrix stimulation in calcareous formations known as wormholes or acid frac type stimulation.

More generally, such methods can be extended to the detection of fractures made for different purposes and fields, like for example searching for water.

Currently various methods for estimating or detecting the geometry of underground fractures are known that do, nevertheless, have limitations in applicability and in reliability and accuracy of the results.

For example, indirect estimation methods are known the correctness of which is linked to the reliability of the estimation models used and to the accuracy of the data used to supply the models.

Preferably, such models are based on the net pressure values used during the fracturing of the formation. In this case, the reliability of the results is closely linked to knowing the net pressure used for fracturing, which is not always available in accurate terms. Alternatively, it is possible to estimate the geometry of an underground fracture based on its contribution to the productivity of the well.

In order to obtain reliable data, it is however necessary to have an ample historical set of data on the productivity prior to the creation of the fracture, for example relating to a time period of many months or years, in order to be able to accurately determine the increased productivity after its creation.

Moreover, the portion of fracture that actually contributes to productivity may not correspond in terms of dimension and geometry to the entire fracture generated during hydraulic fracturing. Consequently, the length of the fracture is generally underestimated.

In addition to the estimation methods based on models, methods for detecting the geometry of an underground fracture are known that can be divided into many categories.

According to a first type it is foreseen to carry out remote measurements through special instruments, like for example tiltmeters suitable for detecting the inclination of a surface generated by the fracture or else receivers capable of detecting the microseismic events connected to the creation of the fracture.

The detection instruments are placed on the surface or else underground in monitoring wells, specially made or already existing, next to the production well in which the fracture is generated.

From the mapping of the measurements deriving from such instruments it is possible to identify the deformation of the subsoil caused by the generation of the fracture and consequently the geometry of the fracture itself.

Such methods, whilst being amongst the most advanced, have limitations of use and are difficult and expensive to apply due to the need to use specific instruments, the laboriousness of their arrangement and possibly the need to make a special monitoring well.

A second type of method for detecting the geometry of an underground fracture count on that the measurement be carried out directly from the production well in which the fracture is generated.

A first of such methods uses radioactive isotopes that are injected together with the filling material and act as markers of the geometry of the proppant pack present in the fracture created.

However, as well as the risks connected to the use of radioactive material, the detection can only be carried out for a relatively short time period equal to the decay time of the isotopes. Moreover, marking with radioactive isotopes is only able to provide an accurate measurement of the geometry of the portions of proppant pack immediately near to the well.

Therefore, this method, just like others based on measuring the temperature or the flow of fluids carried out in the area of the well near to the fracture, is unable to provide a measurement of the length of the proppant pack and therefore of the fracture.

A second method for detecting the geometry of an underground fracture carried out directly from the production well also counts on using a special filling material.

In this case the filling material is enriched with particles able to improve the transmission or reflection of an electromagnetic wave.

Detection occurs through special electromagnetic wave transmitters and respective receivers placed in the well at the opening of the fracture.

The geometry of the fracture is detected through the analysis of the echo signal detected by the receivers.

Although this method is able to offer a measurement of the length of the fracture, it does have various drawbacks.

Indeed, the use of a filling material with special added passive or active particles, as well as entailing substantial time and cost to obtain a material with optimal wave transmission and reflection characteristics, can reduce the production capacity of a fracture.

Indeed, the added particles, in particular those able to improve the reflection of the electromagnetic wave on the walls of the fracture, become deposited on such walls forming an inner coating that can reduce the permeability thereof to the formation fluid.

Currently it is therefore only possible to obtain measurements of the length of the fracture through measurements carried out directly from the production well by potentially giving up a part of the desired increase in production due to the formation of an underground fracture.

The purpose of the present invention is to avoid the aforementioned drawbacks and in particular to make a method for detecting the geometry of underground fractures that is able to offer a reliable measurement of the length and height of the fracture whilst not reducing the production capacity thereof.

Another purpose of the present invention is to provide a method for detecting the geometry of underground fractures that can be applied directly from the production well without using additional monitoring wells.

A further purpose of the present invention is to make a method for detecting the geometry of underground fractures that can be applied with the filling materials generally used for the formation of an underground fracture, therefore without the need for special additives or the introduction of passive or active target particles, to be detected as indicators of the geometry of the fracture.

Another purpose of the present invention is to make a method for detecting the geometry of underground fractures that is able to provide reliable measurements even in the case of a high length of the fracture, i.e. at a substantial distance from the accessible section of the well.

The last but not least purpose of the present invention is to devise a system for implementing the method for detecting the geometry of underground fractures.

SUMMARY OF THE INVENTION

These and other purposes according to the present invention are accomplished by making a method for detecting the geometry of underground fractures as described below and a system for detecting the geometry of underground fractures as described below.

The characteristics and advantages of a method and of a system for detecting the geometry of underground fractures according to the present invention shall become clearer from the following description, given as an example and not for limiting purposes, referring to the attached schematic drawings, in which:

DETAILED DESCRIPTION OF THE INVENTION

Figure 1:
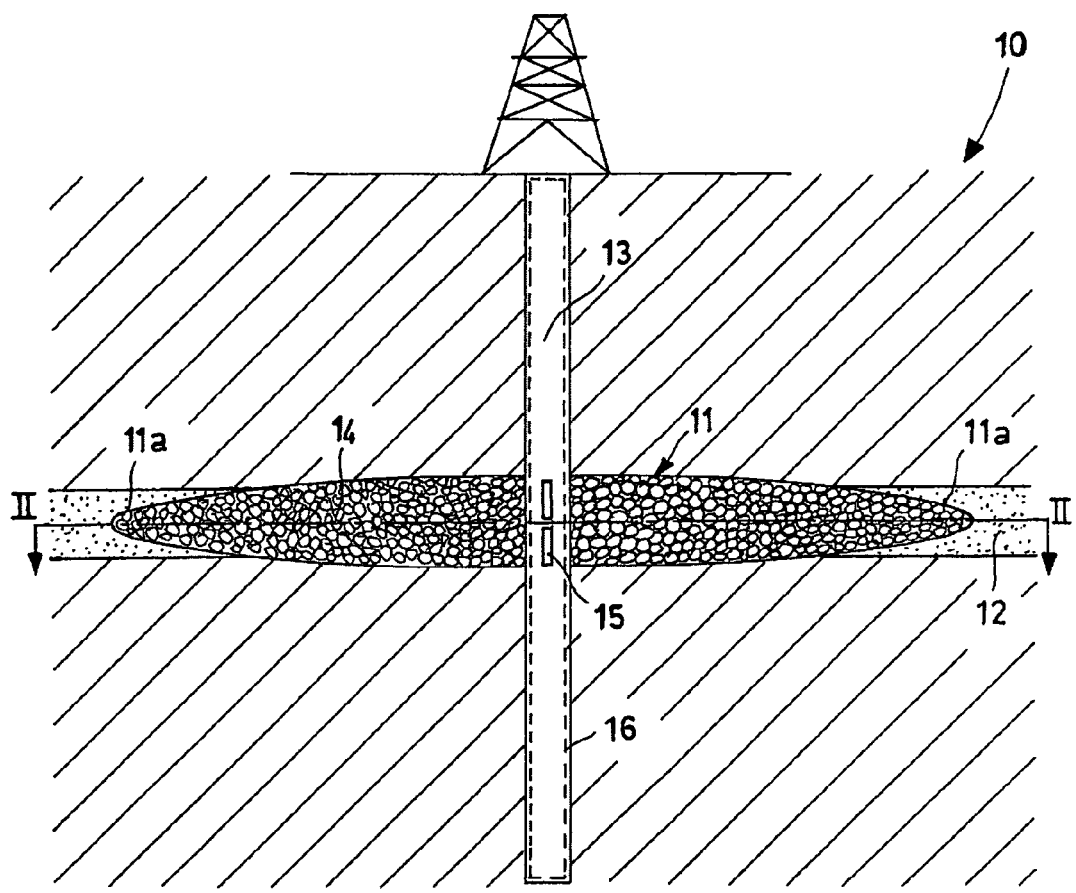
FIG. 1 is a schematic representation of a production well in which a fracture has been made.
Figure 2:
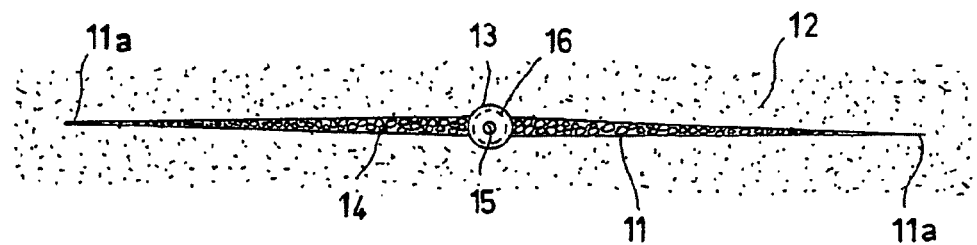
FIG. 2 is a schematic section view along the line II-II of FIG. 1.

With reference to the figures, a production unit is shown wholly indicated with 10 comprising a production well 13 that penetrates a formation 12 of hydrocarbons that has been hydraulically fractured in order to facilitate the flow of hydrocarbons, like for example natural gas and/or oil, from the formation 12 towards the well 13.

According to the method for detecting the geometry of underground fractures of the present invention, during the formation of the fracture 11 filling material or proppant 14 is inserted (step 110) into it in order to prevent the fracture 11 from closing once the hydraulic pressure applied stops. In particular, the filling material 14 used is of the standard type, i.e. without additives.

Hereafter, a special device 15 for emitting electromagnetic waves and for detecting the reflected electromagnetic waves is lowered (step 120) into the production well 13 until it is positioned at the fracture 11.

Figure 3A:
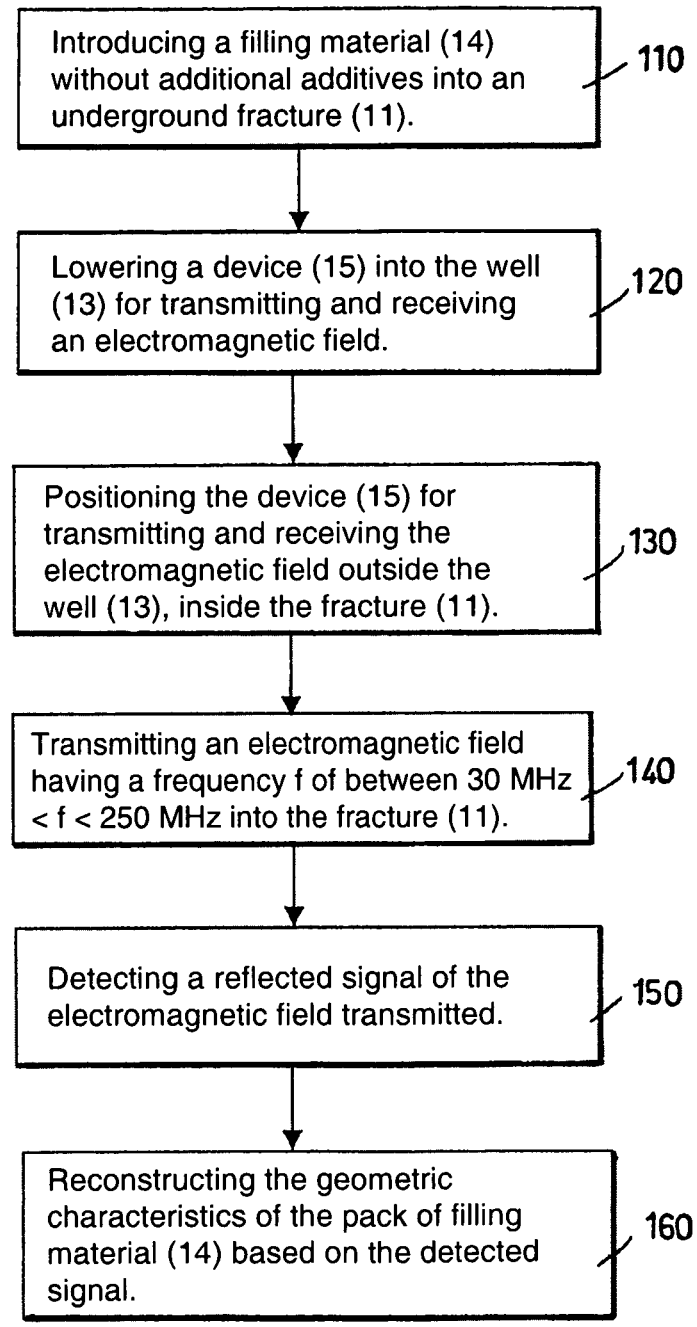
FIG. 3a is a block diagram of a first preferred embodiment of the method for detecting the geometry of underground fractures according to the present invention.
Figure 3B:
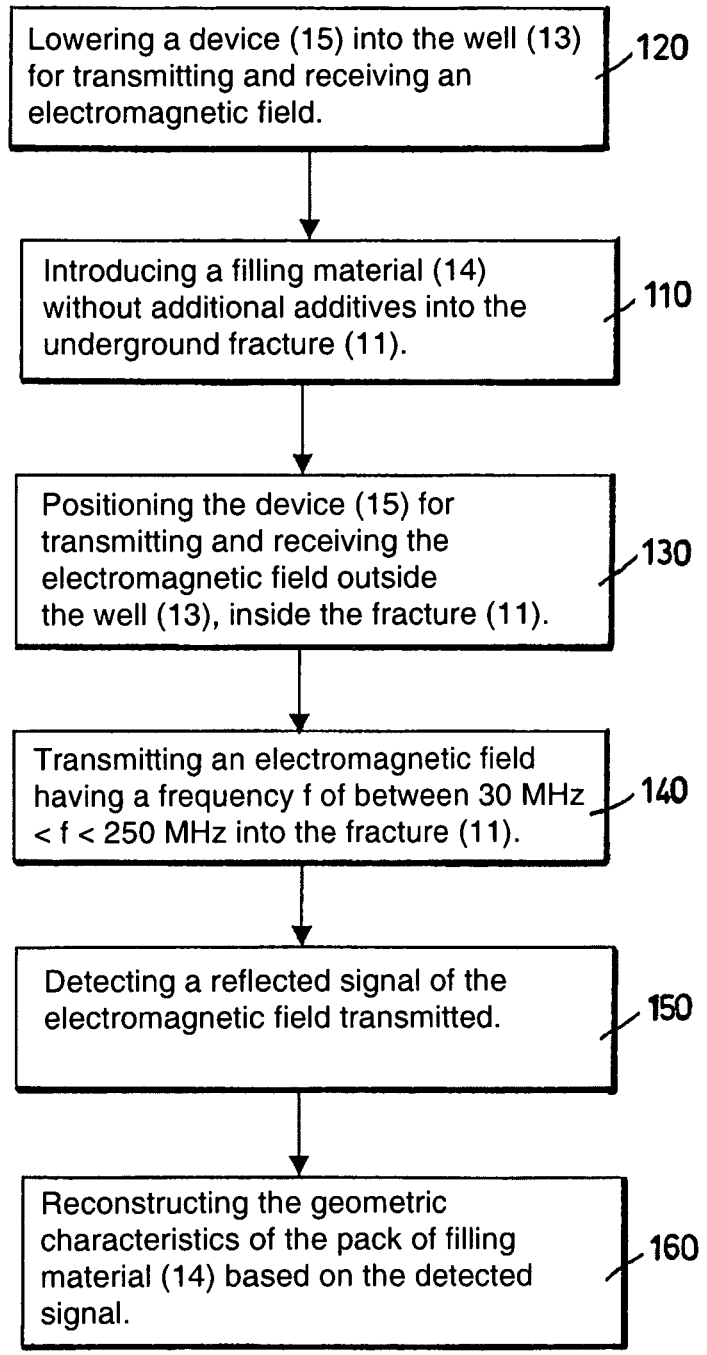
FIG. 3b is a block diagram of a second preferred embodiment of the method for detecting the geometry of underground fractures according to the present invention.
Figure 4:
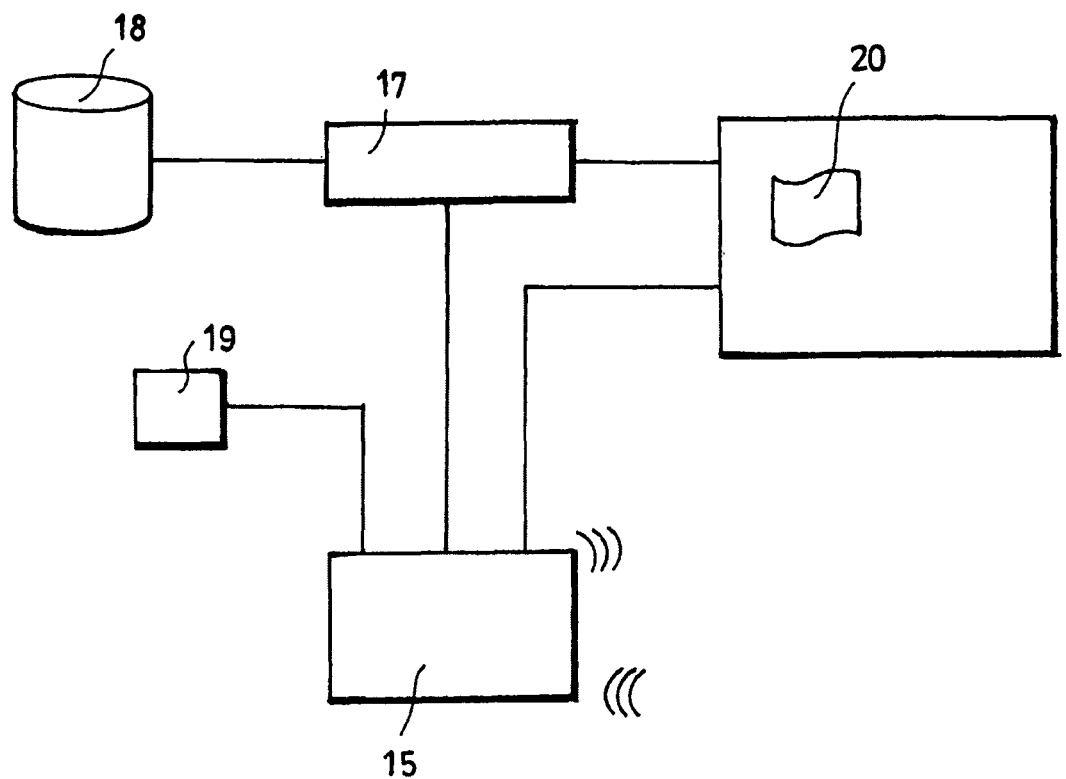
FIG. 4 is a block diagram of a preferred embodiment of the system for detecting the geometry of underground fractures according to the present invention.

Alternatively, the device 15 for emitting electromagnetic waves is located in the well during the step of fracturing and introducing the proppant 14 so as to be able to monitor and control such operations in real time. In this case, step 120 of introducing the device 15 for emitting electromagnetic waves takes place prior to step 110 of introducing the proppant 14, as illustrated in FIG. 3b.

The proppant pack 14 present in the fracture 11 is then irradiated (step 140) with an electromagnetic field and then (step 150) the reflection of such a field, that is created on the discontinuity surface of the electromagnetic and geometric properties between the proppant pack 14 and the walls and/or the volumes inside the fracture 11, is detected.

In the most common case in which there is a metallic tubing or casing 16 in the well to complete it, before the irradiation of the electric field, the emitting and receiving device 15 is preferably positioned (step 130) inside the fracture 11, outside of the metallic walls of the well 13 equipped with casing 16 in order to avoid attenuation of the electromagnetic field transmitted and received due to the shielding effect of the metallic wall of the well 13 equipped with casing 16 (configuration not illustrated).

The data acquired is preferably transmitted in real time to the surface or, alternatively, stored in special storage means 18. The data is then processed (step 160) with suitable processing means 20 comprising software for reconstructing the geometric and dimensional characteristics of the proppant pack 14.

The Applicant has recognised that the propagation of the electromagnetic field in the particular propagation means made up of proppant without additives and of fracturing liquid, or made up of proppant without additives and of hydrocarbons, is particularly advantageous, in particular when compared to that of the surrounding formation, for electromagnetic fields emitted with a frequency of between 30 MHz and 250 MHz.

The reflection of the electromagnetic field irradiated at a frequency within such a range is able to provide a reliable measurement, i.e. an adequate resolution, of the geometry of the fracture and in particular of its length.

In particular, the electromagnetic field emitted at a frequency within such a range is substantially able to propagate through the particular propagation means and reach the end part of the proppant pack 14 thus also providing a measurement of the length of the fracture 11.

The propagation inside the proppant pack 14 can also be positively influenced by phenomena of reflection on the boundary surfaces between the proppant pack 14 and the formation 12, which has different electromagnetic parameters with respect to the proppant pack without additives 14, in this way basically making a dielectric waveguide.

Moreover, the particular frequencies used according to the present invention, ensure that the end part 11a of the fracture 11, where the two surfaces that make up the walls thereof meet up, behaves like a corner reflector capable of providing a significant level of reflection of electromagnetic waves.

Preferably, the electromagnetic field is emitted with a suitable polarisation in order to obtain a sufficient reflectivity of the end part 11a of the fracture 11 and therefore a reliable measurement of the length of the fracture 11. Considering the end part 11a of the fracture 11a substantially linear object, the vector of the electric field is preferably emitted parallel to the progress of such an end part 11a of the fracture 11.

In order to implement the detection method according to the present invention, a measuring instrumentation is preferably used comprising the following equipment:

- a transceiver device 15 for irradiating the electromagnetic field in the proppant pack 14 and for receiving the reflected signal. Such a device can comprise one or more transmitting and/or receiving antennae, for example of the BoreHole type, arranged in the well or in the fracture;
- at least one means 17 for pre-amplifying and/or converting, for example from analogue to digital, the detected signal. Such a means is preferably arranged in the well and in the immediate vicinity of the transceiver device 15 for irradiating the electromagnetic field;
- means 18 for storing the detected signal and/or means for transmitting such a signal to the surface, for example electro-optical converters and relative optical fibres;
- means 20 for processing the detected signal to reconstruct the characteristics of the proppant pack 14;
- means 19 for measuring the azimuth of the fracture 11, i.e. the orientation of the fracture with respect to the direction of North. The means for determining the azimuth 19 can be implemented through electro-mechanical means integrated in the transceiver device 15 at the bottom of the well or else integrated in the processing means 20 generally located on the surface.

Such measuring instrumentation can be made of separate devices or else be integrated in a borehole logging tool.

From the description that has been made the characteristics of the method object of the present invention are clear, just as the relative advantages are also clear.

The method for detecting the geometry of underground fractures according to the present invention can indeed be directly applied from the production well and it is able to provide a reliable measurement of the length of the fracture whilst not requiring the use of special filling materials or proppants with additives.

Moreover, the application of the method for detecting the geometry of underground fractures according to the present invention can be equally advantageously extended to the diagnostics of other techniques for stimulating the production of hydrocarbons, like matrix stimulation in calcareous formations known as wormholes or acid frac type stimulation, or more generally it can be extended to the detection of fractures made for different purposes and fields, like for example searching for water.

Finally, it is clear that the method thus conceived can undergo numerous modifications and variants, all of which are covered by the invention; moreover, all of the details can be replaced with technically equivalent elements.

The invention claimed is:

1. A method for detecting a geometry of underground fractures, comprising:
   a) introducing a filling material into an underground fracture to form a pack of filling material;
   b) transmitting an electromagnetic field into said fracture;
   c) detecting at least one reflected signal of said transmitted electromagnetic field; and
   d) processing said at least one detected signal to reconstruct geometric and dimensional characteristics of said pack of filling material,
   wherein said electromagnetic field transmitted into said fracture has a frequency in a range of from 30 megahertz to 250 megahertz and
   wherein said electromagnetic field is emitted with a parallel polarization with respect to the linear extension of the end part of said fracture, said end part of said fracture behaving like a corner reflector, said filling material comprising a proppant and a fracturing liquid or a hydrocarbon, but without any further additive for improving transmission or reflection of an electromagnetic wave.

2. The method for detecting the geometry of underground fractures according to claim 1, further comprising lowering a device into a production well for transmitting said electromagnetic field and for detecting said reflected signal.

3. The method for detecting the geometry of underground fractures according to claim 2, further comprising positioning said device outside said production well inside said fracture.

4. The method for detecting the geometry of underground fractures according to claim 3, further comprising transmitting said at least one reflected signal to processing means provided for on the surface.

5. The method for detecting the geometry of underground fractures according to claim 4, further comprising storing said at least one reflected signal in storage means.

6. The method for detecting the geometry of underground fractures according to claim 3, further comprising storing said at least one reflected signal in storage means.

7. The method for detecting the geometry of underground fractures according to claim 2, further comprising transmitting said at least one reflected signal to processing means provided for on the surface.

8. The method for detecting the geometry of underground fractures according to claim 7, further comprising storing said at least one reflected signal in storage means.

9. The method for detecting the geometry of underground fractures according to claim 2, further comprising storing said at least one reflected signal in storage means.

10. The method for detecting the geometry of underground fractures according to claim 1, further comprising transmitting said at least one reflected signal to processing means provided for on the surface.

11. The method for detecting the geometry of underground fractures according to claim 10, further comprising storing said at least one reflected signal in storage means.

12. The method for detecting the geometry of underground fractures according to claim 1, further comprising storing said at least one reflected signal in storage means.

13. A system for detecting a geometry of underground fractures, comprising a transceiver device for irradiating of an electromagnetic field at a frequency in a range of from 30 megahertz to 250 megahertz and parallel polarized with respect to the linear extension of the end part of a fracture, into a pack of filling material and for receiving a reflected signal, said transceiver device being connected through transmission means to processing means for processing the reflected signal for reconstruction of geometric characteristics of the pack of filling material, said filling material comprising a proppant and a fracturing liquid or a hydrocarbon, but without any further additive for improving transmission or reflection of an electromagnetic wave.

14. The system for detecting the geometry of underground fractures according to claim 13, wherein said transceiver device comprises at least one of transmitter and receiver antennas.

15. The system for detecting the geometry of underground fractures according to claim 13, further comprising at least one means for pre-amplifying and/or converting the detected signal.

16. The system for detecting the geometry of underground fractures according to claim 13, further comprising a storage means for storing the detected data.

17. The system for detecting the geometry of underground fractures according to claim 13, further comprising a means for measuring the azimuth of said fracture.

18. The system for detecting the geometry of underground fractures according to claim 13, wherein the system is integrated in a borehole logging tool.

* * * * *